US006963538B1

(12) United States Patent
Giroux et al.

(10) Patent No.: US 6,963,538 B1
(45) Date of Patent: Nov. 8, 2005

(54) CONTROLLING ATM LAYER TRANSFER CHARACTERISTICS BASED ON PHYSICAL LAYER DYNAMIC RATE ADAPTATION

(75) Inventors: Natalie Giroux, Ottawa (CA); Ben Bacque, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 603 days.

(21) Appl. No.: 09/199,786

(22) Filed: Nov. 25, 1998

(30) Foreign Application Priority Data

Nov. 28, 1997 (CA) .................................... 2222934
Jun. 12, 1998 (CA) .................................... 2240596

(51) Int. Cl.$^7$ ............................................. H04L 12/26
(52) U.S. Cl. ................................... 370/236.1; 370/468
(58) Field of Search ............................... 370/229, 230, 370/231, 232, 233, 234, 235, 236, 252, 253, 370/389, 391, 395, 912, 236.1, 468; 379/111; 709/223, 224, 225, 226, 233, 235

(56) References Cited

U.S. PATENT DOCUMENTS

| | | | | |
|---|---|---|---|---|
| 5,784,358 A | * | 7/1998 | Smith et al. ................. | 370/230 |
| 5,940,368 A | * | 8/1999 | Takamichi et al. ........... | 370/229 |
| 5,959,973 A | * | 9/1999 | Meurisse et al. ............ | 370/232 |
| 6,018,518 A | * | 1/2000 | Smallwood et al. ......... | 370/235 |
| 6,069,872 A | * | 5/2000 | Bonomi et al. .............. | 370/236 |
| 6,072,989 A | * | 6/2000 | Witters et al. .............. | 455/67.1 |
| 6,118,764 A | * | 9/2000 | Depelteau et al. ........... | 370/235 |
| 6,178,159 B1 | * | 1/2001 | He et al. .................... | 370/234 |

OTHER PUBLICATIONS

Y. Chang, N. Golmie, and D. Su. Study of Interoperability between EFCI and ER Switch Mechanisms for ABR Traffic in an ATM Network. 1995 IEEE. pp. 310-315.*
J. Witters, G. Petit, E. Metz, and E. Desmet. Throughout Analysis of a DGCRA-based UPC function monitoring misbehaving ABR end-systems. 1997 IEEE. pp. 204-213.*
Timothy Kwok et al, "An Interoperable End-to-end Broadband Service Architecture over ADSL Systems (Updated Version)", Sep. 1997.
Stephen Kempainen, "The End of the Wait for Home Internet?", EDN Oct. 10, 1996.

* cited by examiner

Primary Examiner—Hassan Kizou
(74) Attorney, Agent, or Firm—Marks & Clerk; S. Mark Budd

(57) ABSTRACT

A system and method for managing data traffic through a path that includes a transmission link having a transport rate that is subject to change with time. In one embodiment the data traffic is shaped to ATM Forum's available bit rate (ABR) category of service. ABR traffic has an integrated resource management (RM) cell that returns congestion related information to the source over a feedback path. With this congestion information the source end point is able to tailor its traffic send or transmission rate in order to accommodate or take advantage of any change in transport rate encountered by the traffic due to dynamically changing rate over the transmission link.

24 Claims, 5 Drawing Sheets

CONTROLLING ATM LAYER TRANSFER CHARACTERISTICS BASED ON PHYSICAL LAYER DYNAMIC RATE ADAPTATION

FIELD OF THE INVENTION

This invention relates to communications service over an asynchronous transfer mode (ATM) network and more particularly, to management of data traffic over an end-system to end-system path which includes an ATM layer connection and a physical layer link having a transfer or transport rate subject to variation as a function of time. Transfer characteristics provided by the network for the ATM layer connection are controlled based on dynamic adaptation to the physical layer rate variation of the link.

BACKGROUND

Asynchronous transfer mode (ATM) technology is rapidly becoming the technology of choice for broadband digital communications. The fixed length ATM cell is well suited to the transport of multi-media communications including voice, video and data. As a result, ATM technology supports a wide range of services and applications. The ability of ATM technology to adapt to existing systems and architectures results in improved performance and bandwidth utilization.

This has resulted in the integration of ATM architectures with other developing technologies in order to gain the advantages offered by ATM.

The rapid expansion of Internet connections and services in recent years has resulted in attempts to increase the physical layer transfer rate, otherwise referred to herein as the transport rate, over existing telephone connections. Although coaxial cable or optical fiber is being used for trunk connections between central offices, connections to private homes and small businesses generally rely on existing local copper loops. These, of course, have a limited bandwidth and attempts to improve utilization of this bandwidth are being investigated constantly.

One of the technologies which will improve transport rate over that obtained by presently used modems and ISDN lines is known as a digital subscriber line (DSL). xDSL technologies include symmetric digital subscriber line (SDSL), asymmetric digital subscriber line (ADSL) and very-high rate digital subscriber line (VDSL). In ADSL the asymmetric line provides a higher transport rate in the downstream (i.e. to the ADSL subscriber) direction than it does in the upstream (i.e. from the ADSL subscriber) direction. The range of downstream transport rate typically varies from as little as 32 kb/s to over 8 mb/s and the upstream rate from 32 kb/s to over 640 kb/s. This downstream rate offers considerable improvement over the 160 kb/s rates provided by existing ISDN architectures.

As the potential transport rate increases, minor variations in the local loop as a function of time become significant. The transport rate within the above-mentioned range in xDSL technology is known to vary due to physical conditions of the local loop. These physical conditions include the actual condition of the loop itself, temperature variations and/or electromagnetic interference. Therefore, conventional xDSL termination units, also commonly referred to as xDSL modems, are equipped with dynamic rate adaptation functionality whereby the modem dynamically adjusts its transmission rate according to the measured physical characteristics (i.e., usable transport rate) of the loop. The transmission rate in use by the xDSL modem is stored in an internal register which may be read by an end-system connected to the modem.

Currently, the proposed broadband ADSL service interface with an ATM network utilizes unspecified bit rate (UBR), one of the five categories of service defined in the ATM Forum's Traffic Management Specification, version 4.0. This service category is intended for non-real time applications such as those that do not require tightly constrained delay and delay variations. UBR service does not specify traffic related service guarantees. Under UBR service a peak cell rate (PCR) is negotiated between the source and destination at connection setup. The source can send data up to the negotiated PCR.

As indicated previously, the transport rate characteristics of the xDSL link forming part of the path between the two end-systems may change during the time of the connection (i.e. after the connection has been set up). If, for example, the transport rate decreases during this interval the xDSL link will not be able to carry the data at the negotiated transmission rate of the source. As a result, congestion will occur at the interface between the ATM path and the xDSL link leading to packet discard and a reduction in system performance.

Another network architecture in which a transmission link may have a variable transport rate is in a wireless configuration. In this example, the data is transmitted from the ATM network interface card to the destination across a wireless link. Such wireless links are subject to transport rate variations due to atmospheric conditions changing path lengths, etc. Again, if the transport rate characteristic is reduced after the connection has been negotiated, congestion will occur.

A third example of a transmission link having a dynamically varying transport rate is an inverse multiplexing over ATM (IMA) system. In this example, one of the multi paths through the network may experience a temporary failure which results in increase demands on the bandwidth requirements of the remaining paths. If the connections are already operating at or near their physical capacity they will be unable to satisfy the negotiated peak cell rate (PCR) resulting in congestion.

There is, therefore, a requirement to improve the management of data traffic through an ATM path that includes a link having a dynamically variable physical layer transport rate.

SUMMARY OF THE INVENTION

Therefore in accordance with a first aspect of the present invention there is provided in a communications system for transporting data traffic from a source end point to a destination end point over a path which includes a transmission link having a physical layer transport rate which is subject to variations as a function of time, a method of managing transmission of the data traffic through the system, the method comprising: monitoring the physical layer transport rate of the transmission link; sending to the source end point a management cell including rate information based on the monitored physical layer transport rate; and adjusting, by the source end point, the transmission rate responsive to the rate information in the management cell.

In accordance with a second aspect of the invention there is provided in a communications system for transporting data traffic from a source end point to a destination end point over a path which includes a transmission link having a physical layer transport rate which is subject to variations as a function of time, a system for managing transmission of the data traffic through the system, the system comprising: monitoring means associated with the physical layer to monitor the transport rate of the transmission link; sending means to send to the source end point a management cell including rate information based on the monitored physical layer transport rate; and adjusting means, at the source end point, to adjust the transmission rate responsive to the rate information in the management cell.

In accordance with a further aspect of the invention there is provided in a communications system for transporting data traffic from an a source end point to a destination end point over a path which includes a transmission link having a physical layer transport rate which is subject to variations as a function of time, a method of managing transmission of the data traffic through the system, the method comprising: continually monitoring the physical layer transport rate of the transmission link; generating a management cell in response to a change in the monitored physical layer transport rate which exceeds a threshold value, the management cell including rate information based on the monitored transport rate; sending to the source end point the management cell; and adjusting the source end point transmission rate in response to the rate information in the management cell.

In a still further aspect of the invention there is provided in a communications system for transporting data traffic from an a source end point to a destination end point over a path which includes a transmission link having a physical layer transport rate which is subject to variations as a function of time, a system for managing transmission of the data traffic through the system, the system comprising: monitoring means for monitoring the physical layer transport rate of the link; generating means to generate a management cell in response to a change is the monitored physical layer transport rate which exceeds a threshold value, the management cell including information based on the monitored transport rate; means to send the management cell to the source end point; and adjusting means at the source end point to adjust the transmission rate in response to the rate information in the management cell.

In accordance with a further aspect of the present invention there is provided in a communications system for transporting data traffic from a source end point to a destination end point over an ATM path which includes a transmission link having a physical layer transport rate which is subject to variations as a function of time, a method of managing transmission of data traffic through the system. The method comprises: shaping data connections from the source end point in accordance with the ATM available bit rate (ABR) category of service, the ABR connection including integrated resource management (RM) cells for carrying congestion information back to the source over a feedback path; monitoring dynamically the transport rate of the transmission link and recording a rate derived from the monitored transport rate in the RM cell; returning the RM cell including the recorded dynamic transport rate of the transmission link to the source; and adjusting the send rate of the source in accordance with the transport rate information.

In accordance with another aspect of the present invention there is provided a system for managing data traffic from a source end point to a destination end point over an ATM path, the ATM path including a transmission link having a dynamically variable physical layer transport rate. The system comprises shaping means in the source to shape the data traffic connection to comply with ATM available bit rate (ABR) category of service, the ABR connection including an integrated resource management (RM) cell for returning explicit rate congestion information to the source over a feedback path; monitoring means associated with the transmission link to monitor dynamically, the physical layer transport rate capability of the transmission link; recording means in the monitoring means to record a value derived from the transport rate capability in the RM cell; and control means in the source to change the send rate of the data traffic in accordance with the transport rate information.

The invention advantageously uses the instantaneous physical layer information on transmission rates to provide control of the ATM layer congestion control loop, in advance of the onset of congestion and cell loss.

BRIEF DESCRIPTION OF THE DRAWINGS

The invention will now be described, by way of exemplary embodiments, in greater detail with reference to the attached drawings wherein.

DETAILED DESCRIPTION OF THE INVENTION

Figure 1:
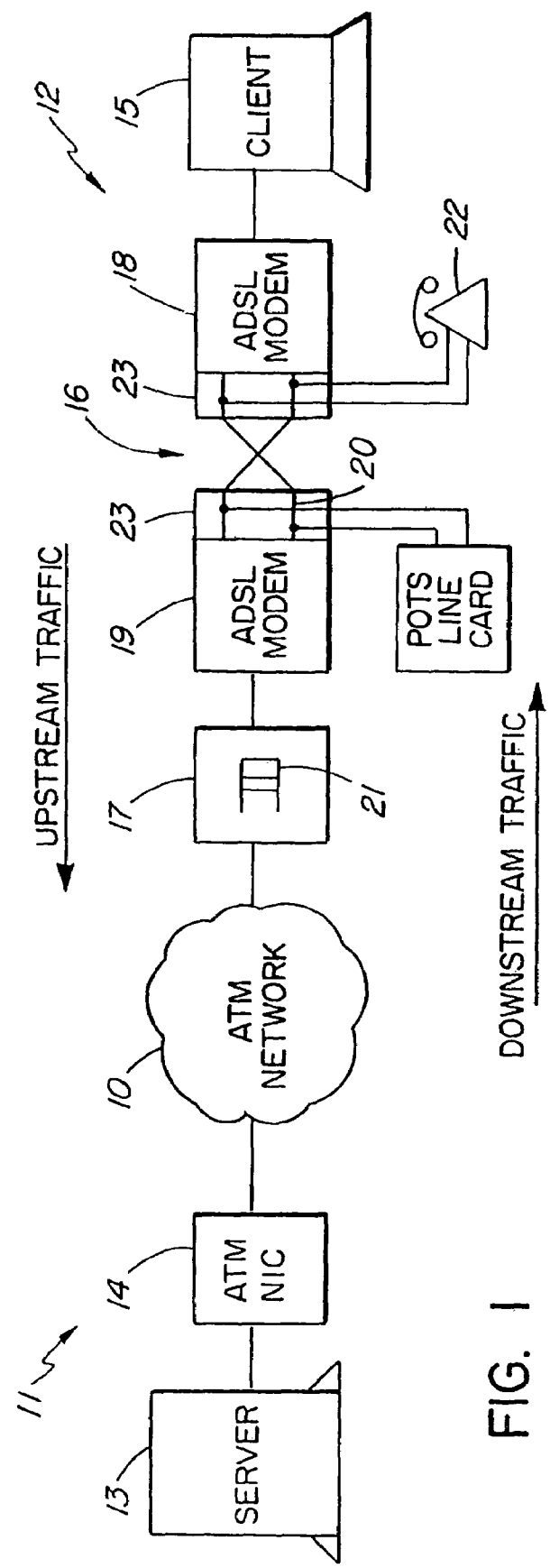
FIG. 1 illustrates an ATM system including an ADSL link.

Turning to FIG. 1, illustrated is an exemplary client-server based data processing system comprising an ATM network 10, communicatively coupled to which are two conventional end-systems 11 and 12. End-system 11 is embodied by a data server 13 connected through an ATM network interface card (NIC) 14 to the ATM network 10. End-system 12 is embodied by a personal computer functioning as a client 15 connected through an ADSL link 16 and ATM termination unit 17 to the ATM network 10. The ADSL link 16 is constituted by two ADSL modem 18 and 19, with which the client 15 and ATM termination unit 17 are respectively equipped and which are interconnected by a typical subscriber loop 20. A telephone 22 may be connected to the ADSL line with or without POTS splitters 23.

Although a client-server architecture is specifically illustrated herein, it should be understood that end systems 11 and 12 can represent any data processing system including, for instance, other communications networks.

Bi-directional data traffic, identified as upstream and downstream in FIG. 1, is exchanged between the two end-systems 11 and 12. With respect to upstream traffic, the client 15 (end-system 12) and server 13 (end-system 11) are the source and destination, respectively. However, for downstream traffic, server 13 (end-system 11) is the source and the client 15 (end-system 12) is the destination.

The ATM termination unit 17 interfaces traffic to and from the ATM network 10 with the ADSL link 16, and includes a buffer 21 for managing egress of downstream traffic onto the link 16. An example of the ATM termination unit 17 is an access node or digital subscriber loop access multiplexer (DSLAM). The ATM termination unit 17 together with the ATM NIC 14 are responsible for shaping ATM layer traffic between their respective end-systems 12 and 11.

Under current proposed schemes, in respect of downstream traffic, data from source end-system 11 is shaped to comply with the ATM Forum's unspecified bit rate (UBR) category of service. This means that at connection setup source end-system 11, network 10 and destination end-system 12 negotiate a data transport rate which represents the peak cell rate which the system can accommodate at that time. Once negotiated the peak cell rate remains constant until the connection is torn down.

ADSL link 16 represents a copper local loop 20 commonly found in private homes and small businesses. It is known that the physical characteristics of ADSL link 16 may change with time due to the physical condition of the link, temperature variations or electromagnetic interference. If the physical characteristic of the loop 20 changes such that the peak cell rate carried by the ADSL link 16 is reduced after the connection has been negotiated, ADSL link 16 will not be able to carry all of the data traffic sent out from source end-system 11. In this case, buffer 21 will become full and a congestion condition will result. Eventually buffer 21 will overflow resulting in cell traffic discard and loss of continuity.

Figure 2:
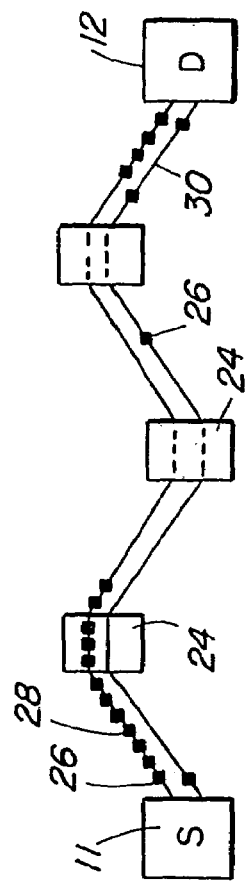
FIG. 2 illustrates an ABR connection with resource management cells.

According to the present invention this problem is overcome by shaping traffic from source 12 to comply with the ATM Forum's available bit rate (ABR) category of service. As shown in FIG. 2, ABR class traffic typically includes data cells 28 and resource management (RM) cells 26 integrated into the traffic flow from source end-system 11. Each network element 24 along the path within the ATM network monitors its local congestion conditions and may mark the resource management cell with an indication of bandwidth availability through that element. When the resource management cells reach destination end-system 12 they are returned towards the source end-system 11 along feedback path 30. Each RM cell, passing back through the network elements 24 receives updated congestion information and returns to the source end-system 11 with an explicit rate (ER) of the available bandwidth or the peak cell rate permitted by the source.

Conventional ER implementations are designed to function with constant speed links carrying variable loads or data traffic. The ER methodology, according to this invention, handles variable rate links along with variable load. A quick convergence to the available or usable bandwidth of a particular variable rate link is desired, and the use of physical layer information about the instantaneous transmission rate of the link achieves increased convergence speed.

Figure 3A:
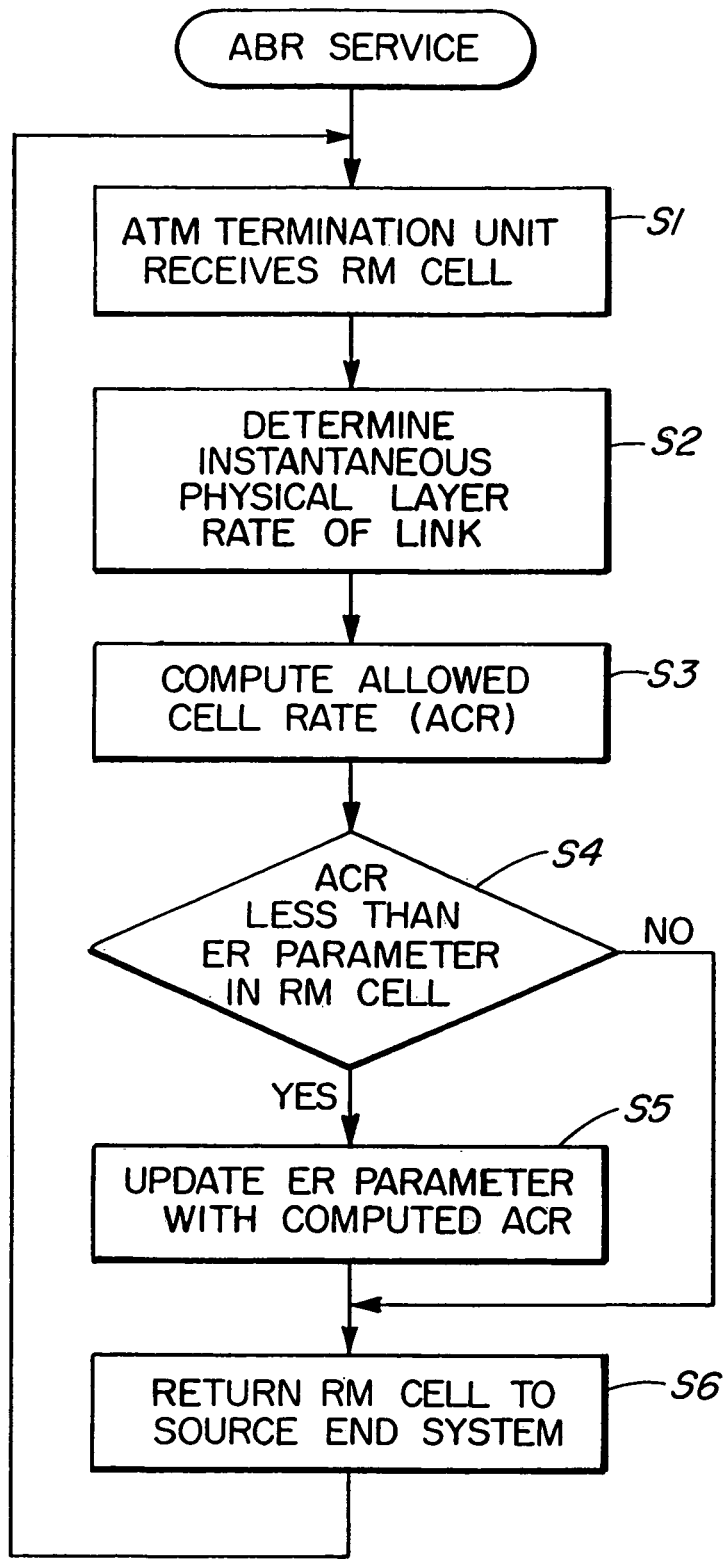
FIG. 3A is a flow chart of the ABR service combining physical layer rate information with ATM layer traffic load.

FIG. 3A, in conjunction with reference to FIG. 1 illustrates the manner in which the ABR category of service is implemented in the present invention. Downstream data traffic egressing from source end-system 11, specifically server 13 is shaped to comply with the ABR category of service. Starting at step S1, the ATM termination unit 17 receives an RM cell, responsive to which the destination end-system 12 determines the instantaneous physical layer rate of the ADSL link 16, at step S2. Such is effected by the ADSL modem 19 measuring (monitoring) the physical layer rate over the loop 20 in a conventional manner and providing the measured physical link rate in an internal register, or memory location from which this information is retrieved by the ATM termination unit 17. The ATM termination unit 17, at step S3, then computes a new allowed cell rate (ACR) as a function of measured ATM layer bandwidth fair sharing, local to unit 17, and the measured instantaneous physical rate of the ADSL link 16. At step S4, the ER value in the received RM cell is compared to the computed ACR. If the ACR is less than that ER, step S5, then the computed ACR is inserted as the new ER parameter in the RM cell, and otherwise advance directly to step S6. Lastly, at step S6, The RM cell of the ABR traffic is returned to the source end-system 11 in order to appropriately modify the send rate of traffic leaving source end-system 11. Thus, if the physical characteristics of ADSL link 16 between the ATM termination unit 17 and destination client 15 changes during the time of the connection, the ACR is now derived from the transport rate (i.e. less than or equal to transport rate) recorded in the ER field of the RM cell and is returned to ATM NIC 14 of the source end-system 11 over the feedback path, thereby shaping the downstream traffic. Consequently, previously occurring congestion problems are avoided.

Conditions may occur in the system wherein it is advantageous to independently generate a management cell containing allowable rate information instead of waiting for the next resource management cell in the ABR loop to carry the new transmission rate to the source end point. On start up or initiation, for example, it may be beneficial to have the instantaneous allowable cell rate passed immediately to the source via an autonomously generated RM cell. Another situation in which it is beneficial to immediately send rate information respecting the physical layer transport rate to the source end is when there is a sudden or dramatic change in available bandwidth. This might occur, for example, when the telephone 22 shown bridging the xDSL link in FIG. 1 goes off-hook. In accordance with one aspect of the invention a change in available, bandwidth such as this will lead to the generation of a management cell containing new transport rate information and this management cell is sent to the source for adjustment of the transmission rate.

It is within the scope of the present invention to have the access modem generate a management cell containing rate information any time a change in transport rate exceeds a preset threshold. This feature may be implemented independently of the resource management cells associated with the ABR category of service or in combination therewith. By immediately generating a management cell with new rate information each time a change in the transport rate exceeds a set threshold potential congestion can be avoided by implementing an adjusted transmission rate earlier. If the traffic is shaped to the ABR category of service the frequency of resource management cells or stated differently the number of RM cells can be reduced as any change in transport rate in excess of the threshold will automatically lead to the generation of a management cell with new rate information. The reduced number of RM cells results in an overall savings of bandwidth to the system as RM cells do not carry data traffic. This feature also results in better buffer utilization and smaller queues with lower cell loss. In the ABR implementation RM cells are still treated normally by other multiplexing or switching nodes in the system, and this feature is interoperable with standard ABR behaviours.

Figure 3B:
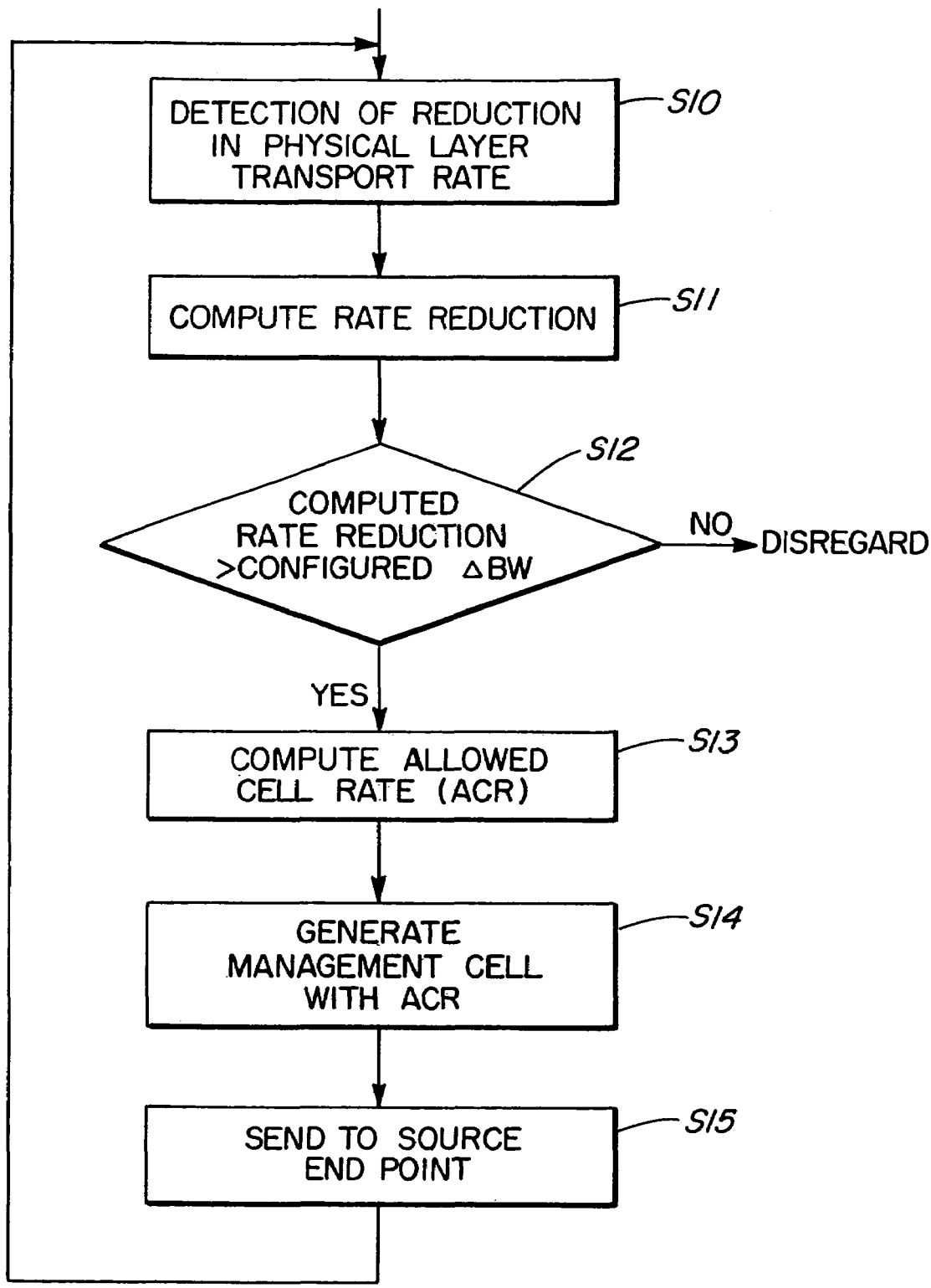
FIG. 3B is a flow diagram of a spontaneous management cell generation process in response to a dramatic change in transport rate of the physical layer.

FIG. 3B illustrates this aspect of the invention. At step S10 there is a detection of an instantaneous change in transport rate of the physical layer of the transmission link (ADSL link in FIG. 1). This change may be caused, for example, by telephone 22 going off-hook. The actual rate reduction is computed at step S11 and this computed rate is compared with the cell rate or link bandwidth negotiated at call set up (step S12). If the reduction is less than a threshold value the occurrence of the detected reduction is disregarded. If, however, the reduction is greater than the threshold value an allowed cell rate (ACR) is computed at step S13. A management cell is generated and rate information based on the ACR is inserted in the management cell at step S14. Finally the management cell with rate information is sent to the source end point and the transmission rate of the system is adjusted accordingly. The foregoing description is based primarily on the detection of a reduction in the transport rate of the physical layer. It will be apparent that this aspect applies to a situation in which the transport rate dramatically increases. This could occur, for example, when the system shown in FIG. 1 with telephone 22 off hook has established a stable transmission rate and the telephone goes on hook. The available bandwidth will suddenly increase and this increase will be detected by the access modem. The management cell generated in this case will contain information which will lead to an increase in transmission rate for the system.

Moreover, different bandwidth change thresholds (ΔBW) can be used, dependent upon whether the physical layer transport rate is decreasing or increasing. It may be advantageous to have a smaller ΔBW when the transport rate decreases, thereby adjusting more quickly to the change. Alternatively, one might choose not to send independently generated RM cells when the physical transport rate increases.

It will also be apparent to one skilled in the art that the processes shown in the flow diagrams of FIGS. 3A and 3B can be combined. Traffic shaped to ABR and having RM cells carrying rate information will be transported through the system in a feedback control loop as previously discussed. In the event of a dramatic or sudden change in the transport rate of the physical layer a management cell will be generated spontaneously and sent to the source end point for transmission rate adjustment. In view of this the number of RM cells in the data stream as part of the control loop can be reduced. The autonomous generation of RM cells allows the control loop to be reduced, while still maintaining high efficiency.

Figure 4:
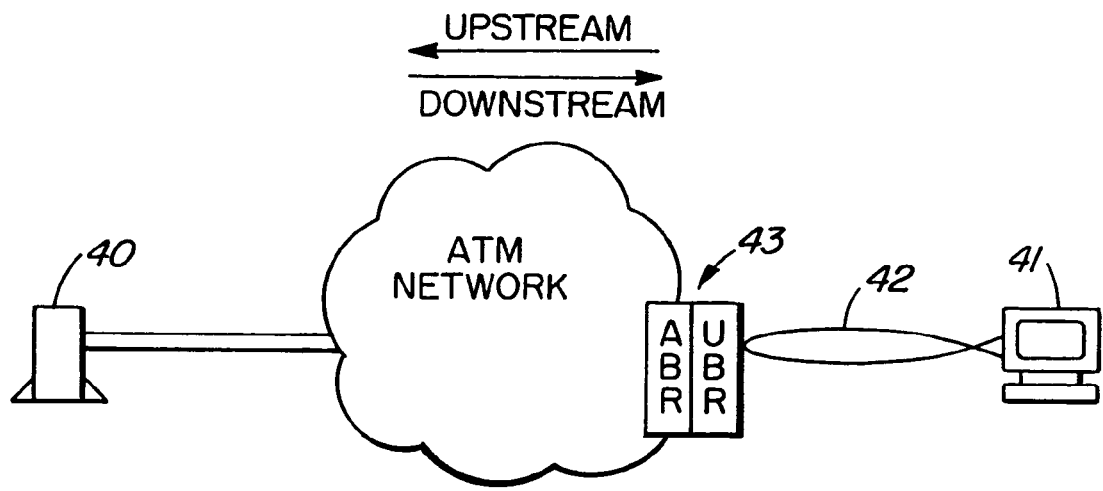
FIG. 4 illustrates the system of FIG. 1 for bi-directional traffic.
Figure 5:
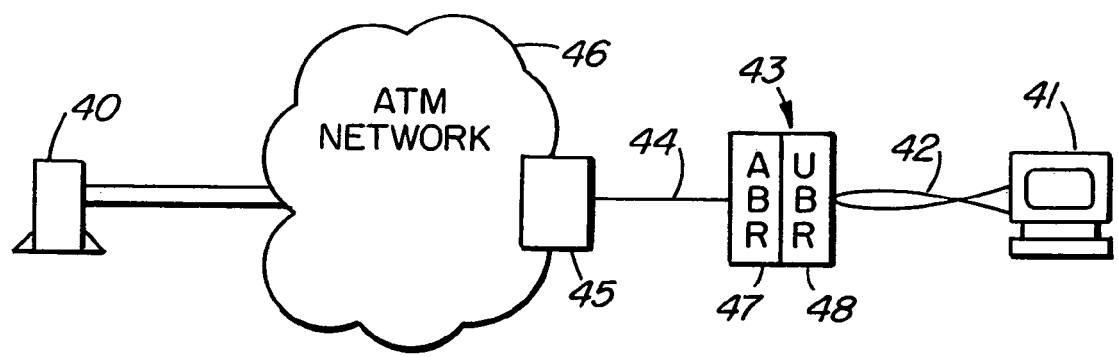
FIG. 5 illustrates a variation of the network shown in FIG. 4.
Figure 6:
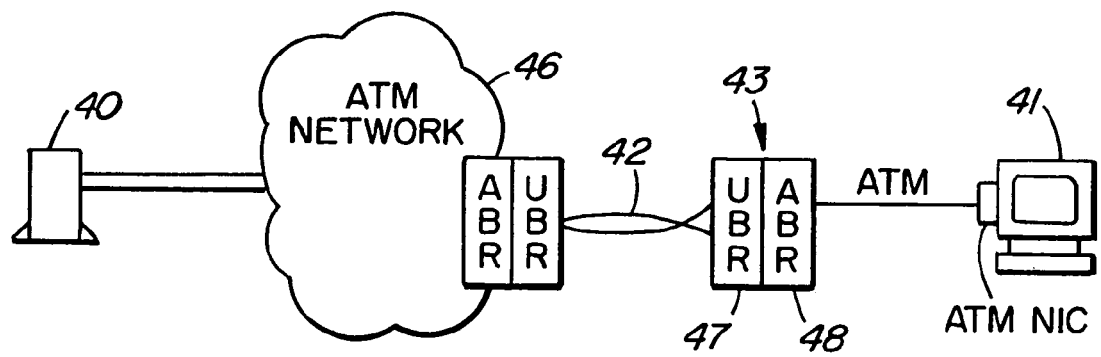
FIG. 6 illustrates a further variation of the network of FIG. 4.

Traffic management for the ATM based system in FIG. 1 has been described thus far having regard to downstream traffic, for which the ABR service class has been used to shape traffic dependent upon the physical layer transmission rate of the ADSL link 16. Of course, ABR may be used to shape the upstream traffic as well. However, some network level efficiencies may be realized by employing a different class of service, e.g. either ABR or UBR, for each direction of such bi-directional traffic. FIGS. 4 to 6 depict various end-system configurations and the preferred service classes to be used.

FIG. 4 relates to bi-directional traffic flow between end systems 40 and 41. In the downstream direction traffic from source end-system 40 to destination end-system 41 is shaped to conform to the ABR category of service as explained above. If, however, traffic is flowing in the upstream direction from source end-system 41 towards destination end-system 40, the change in physical characteristics of ADSL link 42 will not lead to downstream congestion. In this case, traffic may be shaped by the ATM termination unit 43 to the UBR category of service for the upstream direction.

It is noted that the UBR class of service does not transfer resource management cells between end systems, whereas the ABR class of services provides for RM cells in both directions. Consequently, employment of ABR service for downstream traffic (i.e., from end system 40 to end system 41) and UBR service for upstream traffic (i.e., from end system 41 to end system 40) achieves a more efficient utilization of network bandwidth resources because of less overhead.

FIGS. 5 and 6 illustrate different network architectures in which at least a portion of the bi-directional path between end systems 40 and 41 includes an ADSL link 42. As shown in FIG. 5 the path includes optical fiber 44 providing an OC3 link between an access switch 45 of the ATM network 46 and the termination unit 43 which includes ABR interface 47 and UBR interface 48. As in the previous example downstream traffic from end system 40 to end-system 41 is shaped to conform to ABR category of service whereas upstream traffic from end system 41 to termination unit 43 may comply with UBR category of service. It is, of course, within the scope of the invention to shape traffic in accordance with ABR category of service in both directions. FIG. 6 is yet a further example in which the ADSL link is between two ATM networks. As in previous examples, traffic from end source to end source is shaped to ABR but may be shaped to UBR within the network at the interface to the ADSL link 42.

Figure 7:
FIG. 7 is an illustration of an ATM network including a wireless link.

As indicated previously, the ADSL link represents one example wherein physical characteristics of the path may change dynamically to alter the transport rate capabilities. FIG. 7 represents a further example incorporating a wireless path. In this example, virtual destination 50 represents the termination unit for ATM traffic. Destination 52 is configured to received data traffic from virtual destination 50. Traffic between the destination 52 and virtual destination 50 is carried through a wireless path from transmitter 54 to receiver 56. The physical characteristics of the wireless path are also subject to variations due to changes such as environmental conditions. As in the previous example, if the conditions change after the peak cell rate has been negotiated the virtual destination will not be able to transmit data across the wireless link if the data is shaped to UBR. Under ABR shaping the new permitted transport rate is returned to the source (not shown) in order to avoid congestion at virtual destination 50.

Figure 8:
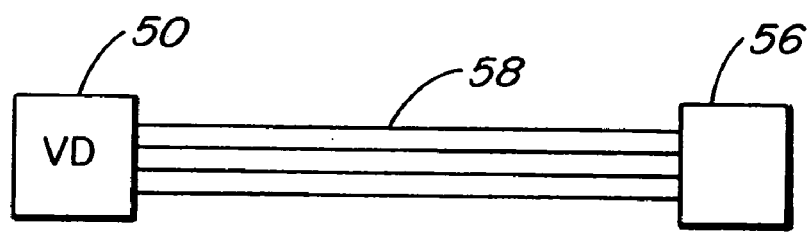
FIG. 8 illustrates an ATM network with an IMA connection.

FIG. 8 is a high level diagram representing an inverse multiplexing over ATM (IMA) configuration. In this example, traffic from virtual destination 50 to actual destination 56 is shared by virtual channel connections 58. Inverse multiplexing occurs at destination 56. A UBR connection between virtual destination 50 and destination 56 will carry traffic at the negotiated rate at connection setup. If one of the intermediate paths 58 is lost or temporarily interrupted, the remaining virtual channel connections will be called on to carry that portion of the traffic which was previously carried by the interrupted connection. This may result in an inability to transport data at the negotiated rate, again resulting in congestion. If the traffic is shaped to the ABR category of service, however, the need to share a greater transport rate will be recorded in the resource management cell and the send rate from the source revised accordingly.

Embodiments of the invention described above include an ATM network interconnecting the two end-systems. However, it is noted that the invention may be readily applied to any data communications networking technology implementing a class of service providing an explicit rate flow control. An explicit rate flow control specifies the particular rate at which a network connection may carry data traffic. Frame relay and Internet Protocol may some day offer various classes of service and explicit rate based service similar to ATM's ABR.

Although certain embodiments of the present invention have been described and illustrated it will be apparent to one skilled in the art that other changes can be made to the basic concept. It is to be understood, however, that such changes will fall within the scope of the invention as defined by the appended claims.

What is claimed is:

1. In a communications system for transporting data traffic downstream from an upstream source over a path which includes a transmission link having a physical layer transport rate which is subject to variations as a function of time due to actual conditions of the transmission link itself, temperature variations and/or electromagnetic interference, a method of managing transmission of the data traffic through the system, the method comprising: the steps of: monitoring the instantaneous physical layer transport rate of said transmission link; sending to said upstream source a management message including rate information based on the monitored instantaneous physical layer transport rate; and adjusting, by said upstream source, said transmission rate responsive to the rate information in said management message in advance of the onset of congestion and cell loss.

2. A method as defined in claim 1 wherein said management message is generated in response to a monitored change in said physical layer transport rate.

3. A method as defined in claim 2 wherein said management message is generated when said change in said physical layer transport rate exceeds a threshold value.

4. A method as defined in claim 3 wherein said management message is generated in response to a decrease in physical layer transport rate in excess of a first threshold value.

5. A method as defined in claim 3 wherein said management message is generated in response to an increase in physical layer transport rate in excess of a second threshold value.

6. A method as defined in claim 1 wherein said traffic is shaped to available bit rate (ABR) category of service traffic including resource management (RM) cells and said rate information is inserted into said resource management cell.

7. In a communication system for transporting data traffic downstream from an upstream source over a path which includes a transmission link having a physical layer transport rate which is subject to variations as a function of time due to actual conditions of the transmission link itself, temperature variations and/or electromagnetic interference, a system for managing transmission of the data traffic through the system, the system comprising: monitoring means associated with the physical layer to monitor the transport rate of said transmission link; sending means to send to said upstream source a management message including rate information based on the monitored instantaneous physical layer transport rate; and adjusting means, at said upstream source, to adjust said transmission rate responsive to the rate information in said management message in advance of the onset of congestion and cell loss.

8. A system as defined in claim 7 including means to generate said management message in response to a change in the transport rate of said physical layer transmission link.

9. A system as defined in claim 8 including means to compare said change in transport rate with a threshold value and to generate said management message only when said change exceeds said threshold value.

10. A system as defined in claim 9 having shaping means to shape said data traffic to available bit rate (ABR) category of service having resource management (RM) cells periodically carrying explicit rate information in a feed back loop to said upstream source, said system including means to insert said rate information into said RM cells.

11. In a communications system for transporting data traffic downstream from an upstream source over a path which includes a transmission link having a physical layer transport rate which is subject to variations as a function of time due to actual conditions of the transmission link itself, temperature variations and/or electromagnetic interference, a method of managing transmission of the data traffic through the system, the method comprising: continually monitoring the instantaneous physical layer transport rate of said transmission link; generating a management message in response to a change in said monitored physical layer transport rate which exceeds a threshold value, said management message including rate information based on said monitored transport rate; sending to said upstream source said management message; and adjusting said upstream source transmission rate in response to the rate information in the management message in advance of the onset of congestion and cell loss.

12. A method as defined in claim 11 wherein said data traffic is shaped to available bit rate (ABR) category of service having resource management (RM) cells for periodically carrying explicit rate information to said upstream source in a feed back loop said rate information being inserted into said RM cell.

13. In a communications system for transporting data traffic downstream from an upstream source over a path which includes a transmission link having a physical layer transport rate which is subject to variations as a function of time due to actual conditions of the transmission link itself, temperature variations and/or electromagnetic interference, a system for managing transmission of the data traffic through the system, the system comprising: monitoring means for monitoring the physical layer transport rate of said link; generating means to generate a management message in response to a change in said monitored physical layer transport rate which exceeds a threshold value, said management message including information based on said monitored transport rate; means to send said management message to said upstream source; and adjusting means at said upstream source to adjust said transmission rate in response to the rate information in the management message in advance of the onset of congestion and cell loss.

14. In a communications system for transporting data traffic downstream from an upstream source over a path which includes a transmission link having a physical layer transport rate which is subject to variations as a function of time due to actual conditions of the transmission link itself, temperature variations and/or electromagnetic interference, a method of managing the transmission of data traffic through the system, the method comprising: shaping a data connection from the source to the available bit rate (ABR) category of service, the ABR connection including integrated resource management (RM) cells for carrying congestion information back to said upstream source over a feedback path; monitoring the physical layer transport rate of said physical layer transmission link and recording a value derived from said monitored rate in said RM cell; returning said RM cell including the recorded value to said upstream; and adjusting by the upstream source the transmission rate in response to the recorded value in the RM cell in advance of the onset of congestion and cell loss.

15. A method as defined in claim 14 wherein said transmission link is a digital subscriber loop (xDSL).

16. A method as defined in claim 15 wherein said digital subscriber loop is an asymmetric digital subscriber loop (ADSL).

17. A method as defined in claim 16 wherein data between said upstream source and a downstream destination is bi-directional.

18. A method as defined in claim 17 wherein data between said downstream destination and said upstream source for at least part of said ATM path is shaped to comply with ATM unspecified bit rate (UBR) category of service.

19. A method as defined in claim 14 wherein said transmission link is a wireless path.

20. A method as defined in claim 14 wherein said transmission link is a path for inverted multiplexing over ATM (IMA).

21. A system for managing data traffic from an upstream source to a downstream destination over an ATM path, the ATM path including a transmission link having a variable physical layer transport rate, said system comprising: shaping means to shape said data traffic connection to comply with ATM available bit rate (ABR) category of service, said ABR connection including an integrated resource management (RM) cell for returning explicit rate (ER) congestion information to said upstream source over a feedback path; monitoring means associated with said transmission link to monitor transport rate capability of said transmission link; recording means to record a rate value derived from said monitored transport rate capability in said RM cell; and control means in said upstream source to adjust the transmission rate of said data traffic in accordance with said transport rate information.

22. The method as defined in claim 1 wherein said management message is contained in a management cell.

23. The method as defined in claim 1 wherein said rate information is new rate information.

24. The method as defined in claim 1 wherein said rate information is rate adjustment information.

* * * * *